UNITED STATES PATENT OFFICE.

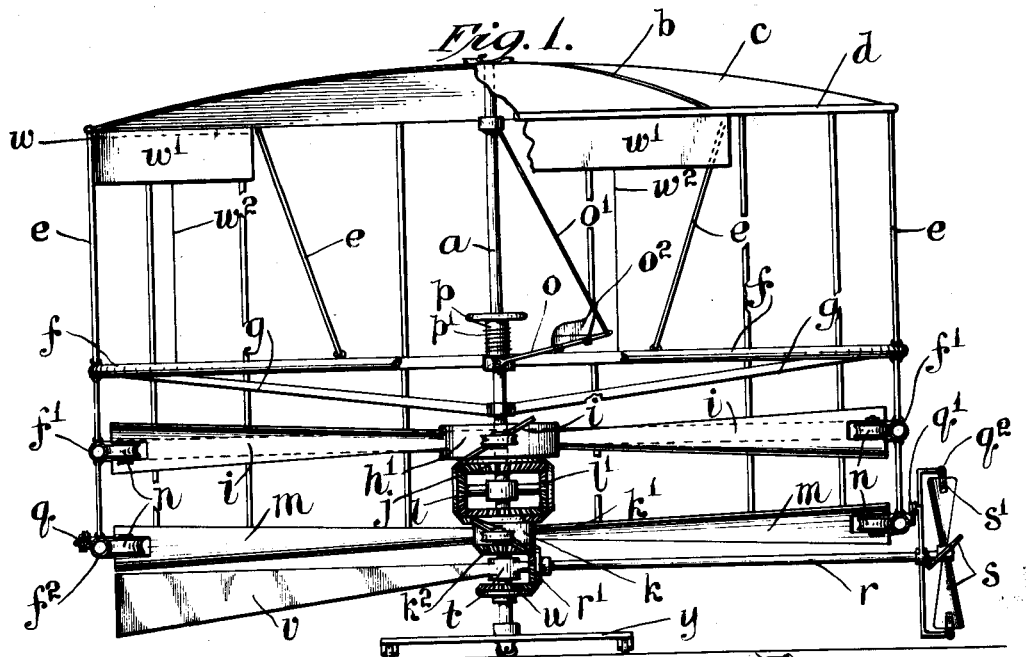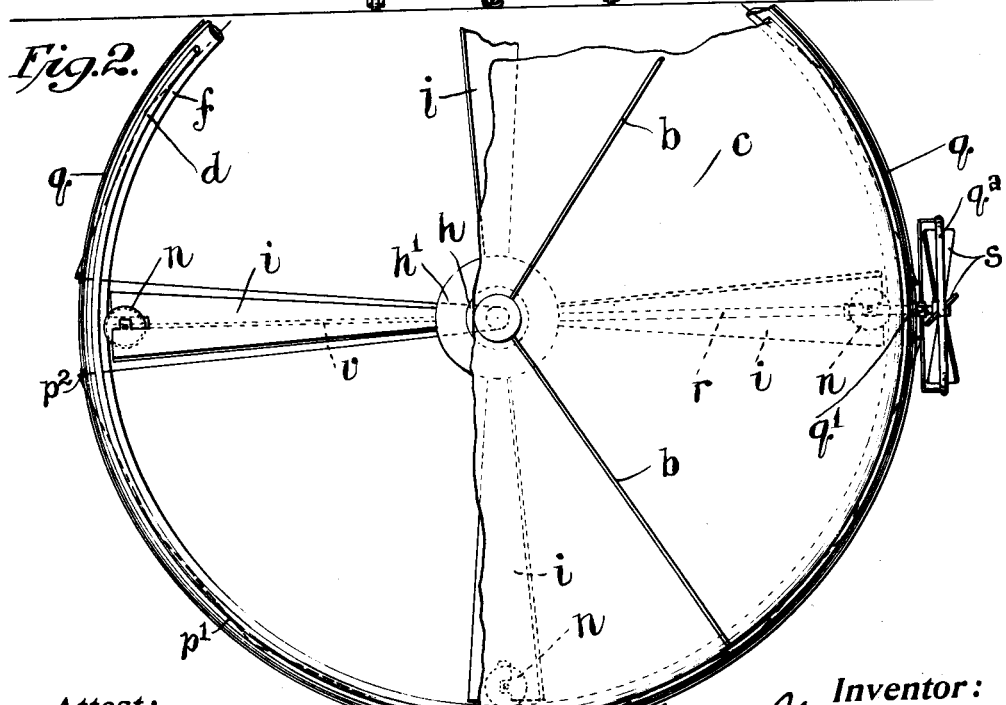

CHARLES STIRIZ, OF NEW YORK, N. Y.

FLYING-MACHINE.

1,058,485.  Specification of Letters Patent.  Patented Apr. 8, 1913.

Application filed May 14, 1909. Serial No. 495,835.

*To all whom it may concern:*

Be it known that I, CHARLES STIRIZ, a citizen of the United States, residing at the borough of Manhattan, in the city, county, and State of New York, have invented certain new and useful Improvements in Flying-Machines, of which the following is a specification, reference being had therein to the accompanying drawings, which form a part thereof.

My invention relates to flying machines and more particularly to a class of heavier than air machines of the helicopter type.

The main object of my invention is to provide a flying machine of the helicopter type wherein the center of gravity of the machine will be low, wherein a sustaining aeroplane will be provided to check the descent of the machine when the power is shut off, and wherein the entire structure of the machine will be light in weight, while possessing the necessary degree of rigidity and strength.

A further object is to provide a machine utilizing horizontal screws as a lifting power, and a circumferentially adjustable, vertical propeller for imparting a horizontal component of motion to the flight of the machine and directing its course.

A still further object is to provide a machine of this character embodying a driving and steering propeller wherein the propeller may be adjusted circumferentially of the lifting propeller from the operator's seat and the operator's seat may be simultaneously adjusted so as to cause the operator to always face the direction of traverse of the machine.

A still further object is to provide a machine wherein the various propeller blades will be so supported at their ends as to minimize the effects of the centrifugal force developed through their rotation, and eliminate possibility of accident to the propeller from this source.

A still further object is to provide a flying machine having a circumferentially adjustable driving and steering propeller wherein the carrier for the steering or power propeller will carry a vertical plane movable therewith, the impact of which with the air will have the effect of aiding in the steering operation and at the same time counterbalance the weight of the steering propeller and its shaft so as to preserve a substantially perfect equilibrium in the machine.

A still further object is to provide a flying machine having lifting propellers, and a driving and steering propeller, which propeller will be driven by enchained gears from the same motive power.

A still further object is to provide a flying machine utilizing a turbine engine the rotor of which will carry a set of propeller blades, thus combining simplicity of structure and lightness of weight, with high motive power.

A still further object is to provide a flying machine having an aeroplane or parachute top adapted to retard the descent of the machine, wherein shields adjacent to the edge of said parachute or plane are provided which shields may be lowered at the will of the operator to aid in the development of the resistance to the descent of the machine. And a still further object is to provide a flying machine of the helicopter type employing a plane or parachute for retarding its descent, wherein the lifting propellers will be so positioned as to avoid the pocketing of air by the parachute or aeroplane to an extent to lower the efficiency of the propellers.

The invention consists in the novel features of construction and combination of parts hereinafter set forth and described and more particularly pointed out in the claims hereto appended.

Referring to the drawings:—Figure 1 is a side elevation of a machine embodying my invention, the lower frame being shown in vertical section so as to more fully disclose the motive power, and the upper frame being partly broken away to more fully disclose the internal structure of the machine, and Fig. 2 is a plan view thereof, the upper portion of the machine being broken away, to disclose a partial plan of the lower frame, and the various lifting and driving propeller mechanisms.

Like letters refer to like parts in both views.

In the embodiment of my invention, shown in the drawings, *a* indicates a center shaft, on the upper part of which is an umbrella frame *b* carrying an aeroplane or parachute *c*. This frame may be made of steel tubing, bamboo, or other light strong material. Encircling the said top is a tubular frame *d* to which the edges of the top *c* are permanently secured. Pendant from the tubular frame *d* by means of hangers *e* are a plurality of circular frames *f*, *f'* and *f²* suitably braced from the center shaft *a* by the braces *g*. The frames *f*, *f'* and *f²* may be made of steel tubing or other light strong material, the upper of these frames being merely an intermediate bracing frame, and the lower frames constituting the power frames for bracing the lifting propellers and carrying the power and steering propeller. The vertical hangers $c$ may be made of any desired material possessing lightness and strength.

Mounted on the shaft $a$ is a turbine engine $h$, to the rotor $h'$ of which is attached a plurality of propeller vanes $i$, which vanes are driven directly by said rotor. Carried by the said rotor is a bevel gear $j$. Loosely mounted on the shaft $a$ and parallel with the gear $j$ is a hub $k$ carrying a bevel gear $k'$, the said shaft $a$ having mounted in fixed bearings thereon intermediate bevel pinions $l\ l'$ meshing respectively with the gears $j\ k$. Carried by the hub $k$ are a plurality of propeller blades $m$ having the same dimensions and the same pitch as the vanes $i$. The transmission mechanism above referred to will thus simultaneously drive the blades $i$, $m$, in opposite directions, causing one set of blades to absorb the reaction of the other and preventing the turning of the entire structure with the operation of the motor.

The solution of aerial navigation by means of heavier than air machines of the helicopter type is the development of high velocity of the lifting propellers, and the application thereto of high horse power with proportionately small weight. This high velocity develops great centrifugal force in the propeller blades, and to obviate this difficulty, I utilize the lower circular frames $f'\ f^2$ as tracks within which the propeller blades rotate, providing suitable anti-friction devices as the rollers $n$ mounted on said blades adjacent to the edge thereof in a position to bear upon said frame $f'$ or $f^2$. This guiding and confining structure not only serves to avoid damage to the lifting mechanism by reason of the centrifugal force developed, but will also serve to prevent substantial vibrations in, or vertical deflection of the blades of the lifting propellers, thus avoiding other sources of danger, or loss of power.

Pivotally mounted on the center shaft $a$ is a brace $o$ having a stay rod $o'$ the upper end of which is also pivotally mounted on the shaft $a$, which brace $o$ carries the radially slidable seat $o^2$ for the operator. About the shaft $a$ is a steering wheel $p$ carrying the steering chains $p'$ by means of which mechanism the course of the machine may be directed from the operator's seat. The steering chains $p'$ extend outwardly to the periphery of the frame $f$, through suitable eyelets or pulleys thereon to similar eyelets or pulleys on the frame $f^2$, and thence through movable pulleys $p^2$ to the steering mechanism.

The exact manner of controlling the steering and controlling mechanism is immaterial, the showing of the drawings being merely a conventional one for the purpose of illustrating the mode of operation of the device.

Carried by the frame $f^2$ is a circular track $q$ on which is mounted by means of a suitable traction wheel a frame $q'$ carrying an outer bearing for the shaft $r$ upon which is mounted the driving and steering propeller $s$. The inner end of the shaft $r$ is rotatably mounted in a bearing in the hub $t$, loosely mounted on the center shaft $a$ below the hub $k$. Mounted on the center shaft $a$ is an idler bevel gear $u$, which is opposed to and parallel with a gear $k^2$ carried by the hub $k$. Meshing with the gears $k^2$ and $u$ respectively is a bevel gear $r'$ keyed to the shaft $r$. Diametrically opposite the shaft $r$ is a vertical vane $v$ carried by the hub $t$ which vane is turned simultaneously with the shaft $r$ of the driving and steering propeller $s$ and by the same mechanism. The function of this vane $v$ is to counterbalance the shaft $r$ and the propeller $s$ and aid in the turning of said shaft until the course of the vehicle has been changed.

Carried by the frame $q'$ is a circular rim $q^2$ encircling the blades of the propeller $s$, the ends of which blades carry anti-friction rollers $s'$ similar in their arrangement and function to the anti-friction rollers $n$ carried by the blades of the lifting propellers.

Mounted in suitable brackets on the circular frame $d$ are a plurality of spring rollers $w$ carrying fabric curtains $w'$ which curtains are adapted to be lowered by means of cords $w^2$ extending therefrom to the frame $f$ and a point adjacent to the operator's seat $o^2$. By lowering these curtains, a large percentage of air may be retained within the parachute top $c$ thus aiding in retarding the descent of the machine when the power is shut off. Mounted in the lower end of the center shaft $a$ is a frame $y$ carrying a plurality of rollers for supporting the structure when it is on the ground or starting or landing platform.

It will be observed that in the structure herein described, the entire weight is centered about the center shaft $a$, and a suitable distance below the parachute or aeroplane top, thus not only avoiding the necessity for nicely balancing the heavier parts of the machine, but bringing the center of gravity down sufficiently to lend stability thereto.

The operation of the machine will be apparent from the foregoing description and by reference to the accompanying drawings, it being merely necessary to describe the general features of the mode of operation of the device.

The controlling mechanism of the engine is not shown in the accompanying drawings, nor the details thereof relating to the storage of the explosive agent therefor, it being apparent that such may be applied to the machine by mere mechanical skill.

When power is developed by the engine, the oppositely rotating propeller vanes *i m* will impart a directly vertical thrust to the entire machine, without rotating the entire machine by reason of the reaction of either propeller blade. The sole function of the said propellers *i m* is to lift the machine, the simultaneous rotation of the propeller *s* imparting that horizontal component of motion necessary to give direction to the flight of the machine. The forward projection of the vane *v* diametrically opposite the axis of rotation of the propeller *s* will make this vane inoperative when the machine is describing a straight course.

When it is desired to change the course of the machine, the operator by means of the hand wheel *p* and the tiller ropes *p'* adjusts the frame *q'*, and with it the shaft *r*, propeller *s*, and the vertical vane *v* circumferentially to the entire machine upon the track *q*. When these parts are being so turned, the vane *v* will serve to aid in turning them until the course of the machine has been changed, at which time it will again become inoperative except as a counterbalance. As the frame *q'* rotates, it will take up the eyelets or pulleys *p²* and move them with it, this structure permitting a wide range in the maneuvers of the machine. As the operator steers the machine, the bracket *o* carrying the seat *o²* may be turned so as to cause the operator to always face the direction in which the machine is traveling.

It will be observed that the lifting propellers *i m* and the driving and steering propeller *s* are simultaneously operated from the same source and through a direct chain of gears, thus simplifying the structure and securing the desired lifting and driving power.

It will be observed that when the speed of the engine is merely sufficient to sustain the weight of the machine in the air, the driving mechanism will still impart a horizontal component of movement.

In descending, the speed of the engine would ordinarily be reduced to a point where the vertical thrust would be insufficient to overcome gravity, but to avoid the necessity for the perfect control of the engine, I provide the parachute or aeroplane top *t* and the shades *w'* to partially sustain the weight of the machine and its occupant, thus avoiding under all conditions, likelihood of falling of the machine through the total stoppage of the motive power.

In the machine constructed as above described, the entire machine will be in a normally balanced condition, the propellers *i m* serving merely to lift the machine and having no tendency to impart a horizontal component of motion thereto.

It is not my intention to limit the invention to the precise details of construction shown in the accompanying drawings, it being apparent that such may be varied without departing from the spirit and scope of the invention.

Having described the invention, what I claim as new, and desire to have protected by Letters Patent, is:—

1. In a flying machine, the combination with a seat carrying frame, of a parachute or aeroplane top for said frame, a lifting propeller mechanism having an axis of rotation passing through the center of said top, a driving propeller having an axis of rotation at right angles to the axis of rotation of said lifting propeller mechanism a shaft therefor projecting radially of the axis of rotation of said lifting propeller, and movable about an axis concentric therewith, means rotating same, and means whereby said driving propeller may be adjusted circumferentially of said lifting propeller, mechanism whereby the course, or horizontal direction of the machine may be controlled.

2. In a flying machine, the combination with a seat carrying frame of a parachute or aeroplane top for said frame, extensible side curtains therefor, a lifting propeller mechanism having an axis of rotation passing through the center of said top, a driving propeller having an axis of rotation at right angles to the axis of rotation of said lifting propeller mechanism a shaft therefor projecting radially of the axis of rotation of said lifting propeller, and movable about an axis concentric therewith, means rotating same, and means whereby said driving propeller may be adjusted circumferentially of said lifting propeller mechanism whereby the course, or horizontal direction of the machine may be controlled.

3. In a flying machine, the combination of a central vertical shaft, a frame about the top thereof, a parachute or aeroplane top carried by said frame, a lifting propeller mechanism arranged symmetrically about said central shaft and below said top, a driving propeller having an axis of rotation at right angles to the axis of rotation of said lifting propeller mechanism a shaft therefor projecting radially of the axis of rotation of said lifting propeller, and movable about an axis concentric therewith, means rotating same, and means whereby said driving propeller may be adjusted circumferentially of said lifting propeller mechanism whereby the course, or horizontal direction of the machine may be controlled.

4. In a flying machine, the combination of a central vertical shaft, a frame about the top thereof, a parachute or aeroplane top carried by said frame, a plurality of oppositely rotatable propellers, a rotary engine forming the hub of one of said propellers, transmission gearing between said propellers, a driving propeller having a horizontal shaft mounted on a hub rotatably mounted on said central shaft, transmission gearing between one of said propellers and said driving propeller shaft, and means whereby said driving propeller may be adjusted circumferentially of said central shaft to control the horizontal course of the machine.

5. In a flying machine, the combination of a central vertical shaft, a frame about the top thereof, a parachute or aeroplane top carried by said frame, a plurality of oppositely rotatable propellers, driving means for said propellers, symmetrically grouped about said vertical shaft, transmission gearing between said propellers, a driving propeller having a horizontal shaft mounted on a hub rotatably mounted on said shaft, transmission gearing between one of said propellers and said driving propeller shaft, means whereby said driving propeller may be adjusted circumferentially of said central shaft to control the horizontal course of the machine, a bracket rotatably mounted on said shaft, a swiveling support for said bracket, and a seat mounted on said bracket, whereby the occupant of said seat may shift his position to conform to the adjustment of said driving propeller.

6. In a flying machine, the combination of a central vertical shaft, a frame about the top thereof, a parachute or aeroplane top carried by said frame, a plurality of oppositely rotatable propellers, driving means for said propellers, symmetrically grouped about said vertical shaft, transmission gearing between said propellers, a driving propeller having a horizontal shaft mounted on a hub rotatably mounted on said shaft, transmission gearing between one of said propellers and said driving shaft, a forwardly projected, circumferentially adjustable aeroplane carried by and rotatable with the hub in which said driving propeller shaft is mounted, means whereby said driving propeller may be adjusted circumferentially of said central shaft to control the horizontal course of the machine, a bracket rotatably mounted on said shaft, a swiveling support for said bracket, and a seat mounted on said bracket, whereby the occupant of said seat may shift his position to conform to the adjustment of said driving propeller.

7. In a flying machine, the combination of a central vertical shaft, a frame about the top thereof, a parachute or aeroplane top carried by said frame, a plurality of oppositely rotatable propellers, a driving mechanism therefor, symmetrically grouped about said central shaft, transmission gearing between said propellers, a driving propeller having a horizontal shaft mounted on a hub rotatably mounted on said shaft, transmission gearing between one of said propellers of said driving shaft, a circular track supported adjacent to said driving propeller, extending about said central shaft and concentric therewith, a frame carrying a bearing for said driving propeller shaft, movably mounted on said track, and means whereby said frame may be moved circumferentially of said central shaft to control the horizontal course of the machine.

8. In a flying machine, the combination of a central vertical shaft, a frame about the top thereof, a parachute or aeroplane top carried by said frame, a plurality of oppositely rotatable propellers, a driving mechanism therefor, symmetrically grouped about said central shaft, transmission gearing between said propellers, a driving propeller having a horizontal shaft mounted on a hub rotatably mounted on said shaft, transmission gearing between one of said propellers of said driving shaft, a circular track supported adjacent to said driving propeller, extending about said central shaft and concentric therewith, a frame carrying a bearing for said driving propeller shaft, movably mounted on said track, means whereby said frame may be moved circumferentially of said central shaft to control the horizontal course of the machine, a steering wheel mounted on said central shaft, and tiller ropes extending from and about said wheel to the periphery of said track and about said track to said movable frame whereby said frame may be shifted circumferentially of said central shaft to control the horizontal course of the machine.

9. In a flying machine, a propeller mechanism including therein a circular frame, a rotary screw, and anti-friction rollers mounted in and projecting from the ends of the vanes of said screw, and engaging said circular frame.

In witness whereof, I have hereunto affixed my signature, this 8th day of May, 1909, in the presence of two witnesses.

CHARLES STIRIZ.

Witnesses:
P. V. WENING,
P. FRANK SONNEK.